UNITED STATES PATENT OFFICE.

HIRAM TUCKER, OF NEWTON, ASSIGNOR TO THE TUCKER MANUFACTURING COMPANY, OF BOSTON, MASSACHUSETTS.

IMPROVED MANUFACTURE FROM IRON IN IMITATION OF BRONZE.

Specification forming part of Letters Patent No. 40,964, dated December 15, 1863; Reissue No. 2,356, dated September 11, 1866.

DIVISION 2.

*To all whom it may concern:*

Be it known that I, HIRAM TUCKER, of Newton, in the county of Middlesex, in the State of Massachusetts, have invented a new and Improved Process or Method for Superficially Bronzing or Coloring Iron, and have thereby produced a new article of manufacture; and I do hereby declare that the following is a description of my invention sufficient to enable those skilled it the art to practice it.

Metals have heretofore been lacquered or bronzed by the application of a solution of resin and metallic powders or salts and dried by exposure to air or heat. Iron has been japanned by covering its surface with oily solutions of asphaltum and pigments and subsequent application of heat sufficient to produce hardness. These are well-known operations.

My invention consists in a new article of manufacture, produced by covering iron with a very thin coating of oil and then subjecting it to heat, the effect of which is to leave upon the iron a firm film, which is very durable and gives the iron a highly ornamental appearance, like that of bronze.

In practice I proceed as follows for the production of my new manufacture: The surface of the iron is cleansed from sand, scale, or other foreign matter, and where fine effects are desired the surface is best made smooth or polished. Under given conditions of heating and oiling, the finer the polish the lighter is the bronze-tint produced. In cases where ornamentation is obtained by relief the salient parts should be the most highly polished or most smoothly surfaced, in order that the color produced upon them shall not be so deep as it is on those parts which are in the rear, so as to imitate thereby more nearly the effects of genuine bronze, in which its natural oxidation is apt to be worn somewhat away from its salient parts, and therefore lighter in color.

When the iron is thus prepared I cover it with a very thin coating of linseed-oil, or any oil which is the equivalent therefor, for the purpose here specified, (such a coating as I find best attained by applying the oil with a brush and then rubbing off the oiled surface thoroughly with a rag, sponge, or other suitable implement,) and then place it in an oven, where it is submitted to a degree of heat which may be measured by an intensity sufficient to change a brightened surface of clean unoiled iron to a color varying from a light straw-color to a deep blue, the lowest degree of heat producing the lightest-colored changes and the lightest bronze, and the highest degree of heat producing the darkest-colored changes and the darkest bronze.

It is important that the coating of oil be made extremely thin, as a coating of any material thickness will leave a rough or varied surface after the heat is applied. As the oiled iron becomes heated the color obtained will be bronze of an intensity corresponding to the degree of heat employed; but it should be observed that the heat may be made so intense and so long continued as to destroy the oil, in which case the iron will lose the bronze-tint acquired, and will assume the dark-blue shade.

The perfection of the results obtained under these instructions will, of course, depend in a considerable degree upon the dexterity and watchfulness of the operator in applying the oil and in regulating the heat.

In practice I prefer to use boiled linseed-oil. When the desired shade of bronzing is obtained the iron is removed from the oven or furnace, and, if desired, may again be treated with oil, as before, even if not cool, and then again submitted to the action of heat, as described; and the operation of oiling and heating may be repeated indefinitely, each repetition deepening the shade of the bronzing. I recommend that at each repetition the degree of heat should be less than the degree immediately before employed; and in oiling and heating more than once, I recommend for the second and succeeding oilings the use of a dry hog-hair brush to take off the surplus oil. The process may be carried to such an extent, by repetition of oiling and heating, as to produce a very dark color—black, even, may be thus produced.

I have specially described linseed-oil as preferred by me for the production of my new manufacture, because of its good drying quality and its capacity of giving a good uniform smooth film when spread thinly upon the iron, as before described.

Slight variations from the degrees of heat above mentioned may be allowed without materially changing the character of my manufacture.

What I claim, and desire to secure by Letters Patent, is—

The new manufacture hereinabove described, consisting of iron ornamented in imitation of bronze by the application of oil and heat, substantially as described.

HIRAM TUCKER.

Witnesses:
J. B. CROSBY,
FRANCIS GOULD.